Nov. 30, 1965  E. E. HOLKESVICK  3,220,511
LIQUID-COOLED DESCENT CONTROL DEVICE
Filed May 31, 1963  2 Sheets-Sheet 1
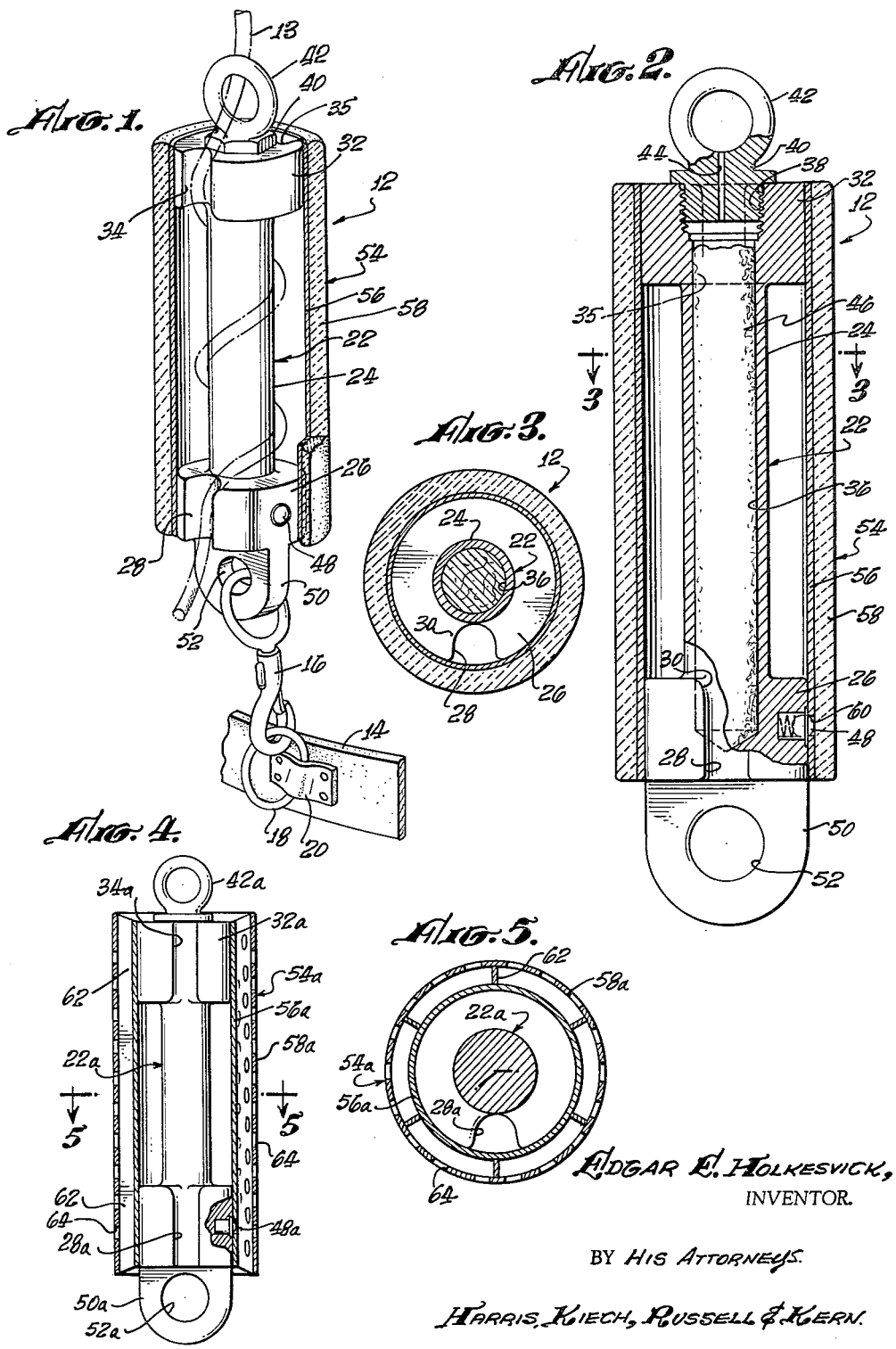
EDGAR E. HOLKESVICK,
INVENTOR.
BY HIS ATTORNEYS.
HARRIS, KIECH, RUSSELL & KERN.

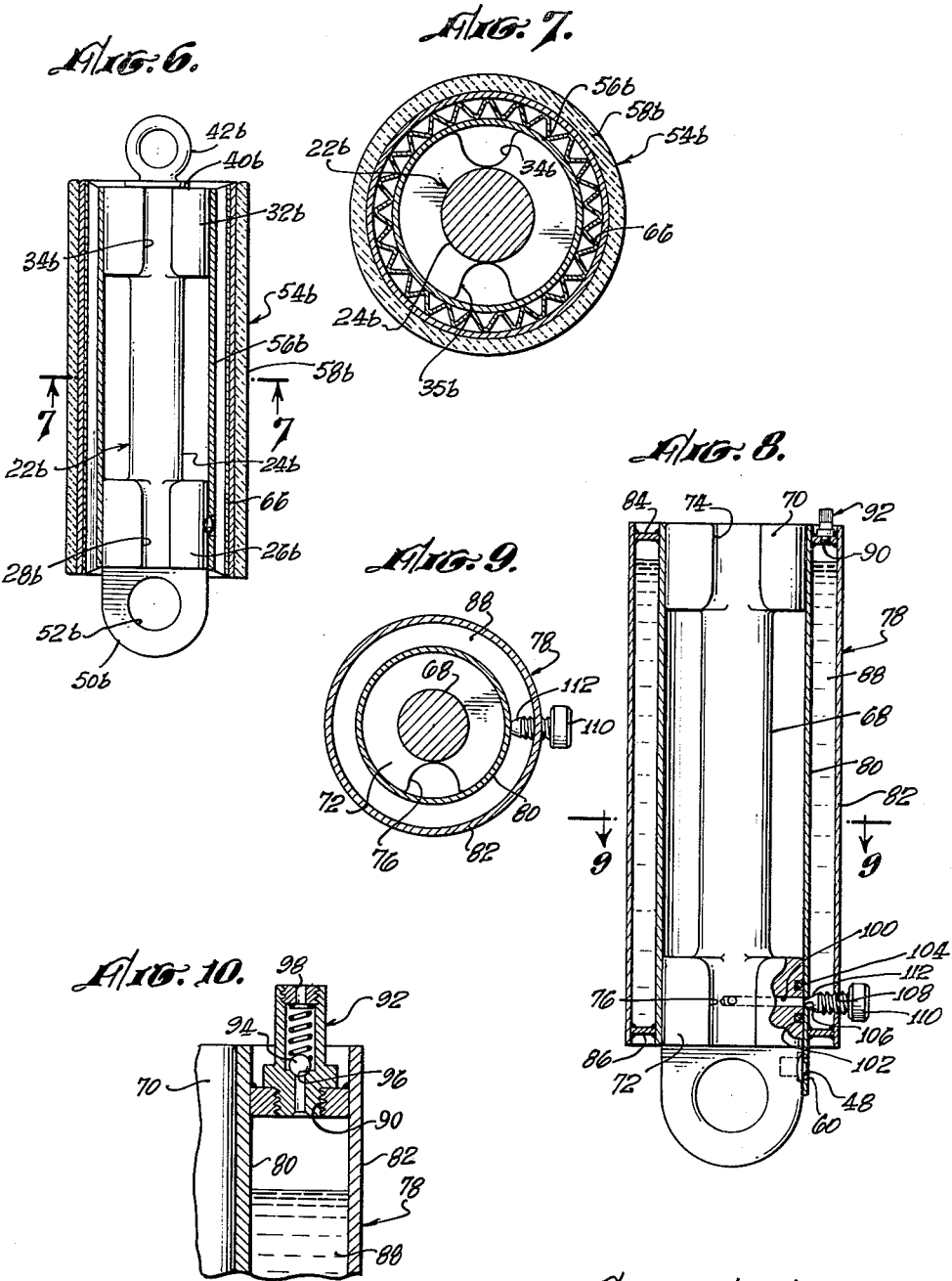

United States Patent Office 3,220,511
Patented Nov. 30, 1965

3,220,511
LIQUID-COOLED DESCENT CONTROL DEVICE
Edgar E. Holkesvick, Fullerton, Calif., assignor of one-half to L. H. Himmelrich, Newport Beach, Calif.
Filed May 31, 1963, Ser. No. 284,498
12 Claims. (Cl. 188—65.4)

The present invention relates generally to the load-handling art and more particularly to a novel liquid-cooled descent control device which is especially useful in the rapid lowering of men and equipment from low-flying and hovering aircraft. Although the operation of the device will be described as when used by paratroopers, it is to be understood that it also finds great utility in fire-fighting and as an escape means from towers and installations under construction.

Briefly stated, one type of device embodying the teachings of the present invention comprises a body member of heat-conducting material having an elongated shaft portion of a length to receive varying turns of rope thereabout, a hub portion adjacent each end of the shaft portion, each hub portion containing at least one slot of a size to slidably receive the length of rope, and means for positioning a volume of liquid having a predetermined vaporization temperature in heat-receiving relationship with said body member to receive therefrom heat produced by the sliding frictional engagement of the rope with said body member. A sleeve member may also be removably mounted on the body member for at least partially enclosing the slots to prevent the rope from moving transversely therefrom, which sleeve member preferably includes means for controlling the flow of heat from the body member so as to maintain the outer surface of the sleeve member at a temperature which will permit the device to be used for prolonged periods of time.

At the present time, it is conventional for paratroopers and the like to descend from low-flying aircraft by using quick opening parachutes, or to descend from hovering aircraft such as helicopters by using leather gloves to slide down a rope which hangs from said last-mentioned aircraft. Unfortunately, neither of these methods of rapid descent is fully satisfactory because the troopers often strike the ground with such force as to cause them to be temporarily disabled or critically injured.

It is an object of the present invention, therefore, to provide a novel descent control device for quickly and safely lowering men and equipment from low-flying and hovering aircraft. More particularly, it is an object to provide such a device which is relatively simple in construction, light in weight, and which can be carried by a trooper and quickly attached by him to a rope hanging from an aircraft, whereby he can quickly and safely descend to the ground therefrom.

It is a further object to provide a novel descent control device for controlled frictional engagement with a length of rope depending from a structure or an aircraft, whereby the rate of movement of the device and its load relative to the rope can be controlled at will by the user. More particularly, it is an object to provide such a device which includes means for presetting the maximum rate of descent and which also includes means for further decreasing the rate of descent during the actual operation of the device.

Because a device of the type described hereinabove is in sliding frictional engagement with a rope and thereby generates an appreciable amount of heat during usage, it is yet another object of the present invention to provide means for protecting the user from being burned by the heat generated in the device. More particularly, it is an object to provide such a device which is heat-shielded and/or which includes means for maintaining the temperature of the device below a predetermined level. Specifically, it is an object to provide such a device which includes means for dissipating the heat generated therein during the usage thereof, without unduly increasing the size or weight of the device.

Further objects and advantages of the present invention will be apparent from the following detailed description, reference being had to the accompanying drawings wherein preferred embodiments of the present invention are shown.

In the drawings:

FIG. 1 is a perspective view, partially in section, showing one form of a device constructed in accordance with the teachings of the present invention;

FIG. 2 is an enlarged vertical sectional view of the device shown in FIG. 1;

FIG. 3 is a horizontal sectional view taken on the line 3—3 in FIG. 2;

FIG. 4 is a vertical sectional view of the modified form of the subject device;

FIG. 5 is an enlarged horizontal sectional view taken on the line 5—5 in FIG. 4;

FIG. 6 is a vertical sectional view of another modified form of the subject device;

FIG. 7 is an enlarged horizontal sectional view taken on the line 7—7 in FIG. 6;

FIG. 8 is a vertical sectional view of yet another form of the subject device;

FIG. 9 is a horizontal sectional view taken on the line 9—9 in FIG. 8, and

FIG. 10 is a fragmentary enlarged vertical sectional view of the vent valve shown in the upper right-hand corner of FIG. 8.

Referring to the drawings more particularly by reference numerals, specifically FIGS. 1 through 3, 12 indicates generally one form of a descent control device constructed in accordance with the teachings of the present invention, said device being shown used with a length of rope 13 and removably attached to a troopper's belt 14 by means of a hook catch 16 of conventional construction, the latter engaging a ring 18 fastened to the belt 14 by means of a tab 20.

The descent control device 12 includes a body member preferably made from a material having a high rate of heat conductivity such as aluminum, and comprises an elongated shaft portion 22 having an outer cylindrical surface 24 which is preferably polished, and which may be plated as with chromium. Adjacent the lower end of the shaft portion 22 is a lower hub portion 26 of circular configuration which contains a generally axially extending slot 28 therethrough, said slot having an inner wall surface and opposed side wall surfaces. The inner wall surface of the slot 28 is co-extensive with the outer surface 24 of the shaft portion so that there is no edge or projection therebetween to cause the rope 13 to wear as the descent control device moves along it, as will be described more fully hereinafter. Also, because the rope 13 passes between the hub and the shaft portion at an angle to the longitudinal axis of the device, the innermost portions of the sidewall surfaces of the slots 28 are rounded as at 30 (FIG. 2) to further eliminate sharp edges or corners which would cause undue wear of the rope.

Adjacent the upper end of the shaft portion 22 is an upper hub portion 32 of circular configuration which contains two opposed, generally axially extending slots 34 therethrough, each of these slots also containing an inner wall surface which is co-extensive with the outer surface 24 of the shaft portion and which also contains side wall surfaces which have the innermost ends thereof rounded as at 35 in the manner described hereinabove with respect to the slot in the lower hub portion. Also, it will be noted that the slots have an arcuate configuration when viewed in cross section, and are of a size to slidably receive the rope 13.

Formed in the shaft portion is an elongated cavity 36 (FIG. 2) which extends from the upper surface of the upper hub portion 32, downwardly through the shaft portion and into the lower hub portion 26, the upper end of said cavity being provided with internal threads 38 for removably receiving a plug member 40 having a ring portion 42 extending from the upper end thereof. A small passageway 44 extends through the plug member to provide communication between the cavity 36 and the atmosphere, for a purpose to appear. A liquid absorbent wick member 46 is provided in the cavity 36, and, in the operation of the device is saturated with a liquid having a relatively low boiling point, as for example water or alcohol.

Returning to a consideration of the lower end of the device, the outer surface of the lower hub portion is provided with a spring-biased ball detent 48 (FIG. 2) and depending from the lower surface of said hub portion is a flange member 50 provided with an opening 52 for receiving one end of the hook catch 16 previously described.

Slidably and removably mounted over the hub portions 26 and 32 is a cylindrical sleeve member 54 which prevents the rope 13 from moving transversely out of the slots 28 and 34 during the operation of the device, and which can also function as a heat insulating member. Thus, the sleeve member 54 can include an inner liner 56 of heat-conducting material such as aluminum or copper for conducting heat to the masses provided at the end of the device by reason of the hub portion 26 and 32, and an outer jacket 58 of heat-insulating material such as wood, Fiberglas, ceramic, or the like.

As shown in FIG. 2, the inner liner 56 is provided with an aperture 60 for receiving the detent 48 to thereby releasably maintain the sleeve member 54 on the body member during the operation of the device.

The rope 13 is preferably of braided construction to prevent the descent control device 12 and its load from twisting about the rope during the trooper's descent, and is preferably made from a synthetic material having high heat resistance, as for example nylon or polyester fiber.

*In use,* the plug member 40 is removed from the top of the cavity 36 and the wick 46 is soaked with a liquid having a relatively low boiling point, as for example water or alcohol, and the plug is then threaded into the upper end of the cavity.

The sleeve member 54 is then removed from the body member and one end of the rope 13 is passed through the sleeve member and a portion of the rope adjacent thereto wrapped around the shaft portion 22 the desired number of times and then inserted in the slots 28 and 34. It should be noted that the upper hub portion 32 contains two slots whereas the lower hub portion 26 contains only a single slot. This permits the taking of one half of a turn about the shaft portion so as to provide for a finer control of the rate of descent, as will be described more fully hereinafter.

After the rope has been applied to the body member, the sleeve member is slipped over the hub portions until the aperture 60 engages the ball detent 48. The hook catch 16 is then snapped onto the ring 18 carried on the trooper's belt, and when the upper end of the rope is secured to the aircraft or other structure from which the trooper is to descend, he can jump from the aircraft or structure and will descend safely and quickly to the ground by reason of the device 12 sliding along the rope 13 in frictional engagement therewith, the number of turns of the rope about the shaft portion 24 determining the rate of descent.

As the rope 13 slides over the outer surface 24 of the shaft portion and through the slots 28 and 34, heat is produced in the rope and in the body member due to the frictional engagement between the rope and the aforementioned surfaces. Some of this heat is conducted along the shaft portion 22 to the relatively large masses provided by the hub portions 26 and 32 where it is initially absorbed and then some of it is radiated to the surrounding atmosphere. Heat which is radiated from the shaft portion to the inner liner 56 is also conducted by the liner to the hub portions and a portion of it is likewise radiated to the atmosphere.

The heat which is not radiated to the atmosphere from the hub portions is transmitted to the liquid soaked wick 46, and, increases the temperature of the liquid until reaches the vaporization point. Thereafter, further heat which is generated by the rope sliding over the aforementioned surfaces is absorbed by the liquid as heat of vaporization and the vapor which is produced thereby escapes to the atmosphere through the passageway 44 in the plug member 40.

It will also be noted that the outer jacket 58 retains the heat within the device and protects the trooper's hand from being burned when it comes in contact with the sleeve member 54.

Accordingly, the temperature of the outer jacket 58 which may be grasped by the trooper during the usage of the device is maintained at a reasonably safe temperature regardless of how rapidly the unit is used by other troopers, or the distance of the trooper's descent from the low-flying or hovering aircraft, i.e. so long as the wick 46 contains some liquid which has not yet been vaporized.

It is to be understood that there are many different liquids which can be used in the subject device, the preferred liquid having a vaporization temperature which is low enough to prevent the device from becoming too hot during usage, but which is high enough so that it will not vaporize at too low a temperature and be dissipated before the descent has been completed. Although the vaporization temperature of water is relatively high so that a person's hand coming in contact with a metal surface at that temperature would be painfully burned, water has been successfully used in this device because of the insulation or shielding provided by the outer jacket 58. In short, even though the temperature of the body member may increase to the neighborhood of 200° F., the sleeve 54 is maintained at a considerably lower temperature during the time the device is in actual usage.

It is also to be understood that other types of sleeve members can be used in order to insulate the outer surface of the device from the heat generated therein, which outer surfaces may be grasped by the trooper during the usage of the device. A few of these modified sleeve constructions are shown in FIGS. 4 through 7.

Referring first to the modified construction shown in FIGS. 4 and 5, wherein like parts contain the same numerals used in FIGS. 1 through 3 except that the letter *a* has been added thereto, an insulating sleeve member 54*a* may include an inner liner 56*a* of heat-conducting material such as aluminum or copper, with an outer jacket 58*a* spaced radially therefrom by means of longitudinally extending fins or spacers 62, the outer jacket being provided with a plurality of closely spaced vent apertures 64. In this construction, the outer jacket 58*a* prevents the trooper's hand from coming in contact with the relatively hot inner liner 56*a*, and the flow of air through the space provided between the inner liner and the outer jacket, and through the vent apertures 64, maintains the outer jacket 58*a* at a relatively low temperature.

In the modified construction shown in FIGS. 6 and 7, wherein like parts are numbered as in FIGS. 1 through 3 except that the letter *b* has been added thereto, the sleeve member 54*b* may include an inner liner 56*b* of a heat-conducting material such as copper or aluminum and an inner jacket 58b of a heat-insulating material such as wood, ceramic, Fiberglas, or the like, spaced radially therefrom as by a longitudinally extending spacer 66 which has an accordion pleat configuration. In this construction, the spacer 66 functions both as a heat radiator and also permits the air to flow between the inner liner and the outer jacket so as to reduce the amount of heat which reaches the insulated outer jacket 58b.

It is to be understood that the insulated and vented sleeve members described hereinabove are useful in preventing the sleeve member from becoming unduly hot even though the liquid soaked wick is not employed. Thus, on short descents and where the device is used by only one trooper, the heat which is generated is retained within the device during the usage thereof and/or is radiated from the ends of the hub portions or from between the inner liner and the outer jacket.

As explained above, a liquid-soaked wick in a cavity pivoted in the shaft portion aids in limiting the temperature of the body portion. Another construction also utilizing the same heat of vaporization principle is shown in FIGS. 8 through 10 wherein a reservoir or body of liquid is used in place of the water-soaked wick.

Thus, referring to FIG. 8, there is provided an elongated shaft portion 68 with upper and lower hub portions 70 and 72, respectively, said hub portions being provided with generally axially extending slots 74 and 76, respectively, which portions and slots are similar in construction to like portions previously described with respect to FIGS. 1 through 3. However, in this modified construction the sleeve member 78 comprises a cylindrical inner liner 80 and a cylindrical outer jacket 82 which are spaced apart by an upper annular end plate 84 and a lower annular end plate 86 so as to provide a reservoir 88. Contained in the upper end plate 84 is a threaded opening 90 which receives a pressure-actuated vent valve 92 (FIG. 10) which includes a spring-biased ball valve member 94 which can be moved away from a valve seat 96 by excess vapor pressure in the reservoir 88 so as to permit the vapor to escape to the atmosphere through a vent passageway 98 provided in the upper end of the valve.

Consequently, when heat is developed in the shaft portion 68 and the hub portions 70 and 72 by reason of their frictional engagement with the sliding rope 13, the temperature of the outer jacket 82 will not appreciably exceed the vaporization temperature of the liquid contained in the reservoir 88 because the heat passing into the liquid by radiation from the shaft portion 68 and by conduction from the hub portions 70 and 72 will be utilized in vaporizing the liquid which will unseat the valve 94 and escape to the atmosphere through the vent passageway 98.

Because the trooper's hand will come in contact with the outer surface of the reservoir 88, it is necessary to use a relatively low-vaporization-point liquid so as to maintain the temperature of the outer jacket 82 at no more than about 110° F. Thus, the vaporization temperature of the liquid should not be so low that the liquid will vaporize due to ambient temperature and without the device being in use, but on the other hand, it should not be so high that the outer surface of the jacket 82 will be too hot to touch before the liquid starts to vaporize. Another point to bear in mind is that the mere mass or volume of the liquid in the reservoir 88 will tend to limit the temperature of the outer jacket 82 because the liquid within the reservoir will absorb the heat, and in this manner, provide some protection as when the descent is of such a short duration that the maximum frictional heat will not be developed.

It should be understood, however, that a similar type of liquid reservoir with a pressure-responsive vent valve similar to the valve 92 shown in FIG. 10 can be used in the embodiment shown in FIGS. 1 through 3 in place of the water-soaked wick 46, and, in such a construction, water can be used as the liquid even though it vaporizes at 212° F. or above in view of the fact that an insulated outer jacket 58 (FIG. 2) or a spaced outer jacket 58a (FIG. 4) or an insulated and spaced outer jacket 58b (FIG. 6) prevents maximum heat from passing to the outermost surface of the device during the relatively short time it is normally in use.

It may also be advantageous to employ the heat of vaporization principle in a somewhat different manner, as illustrated in the embodiment shown in FIGS. 8 through 10 wherein the liquid may be applied to the rope 13 as it enters the device. Thus, referring to FIG. 8, the lower hub portion 72 may contain a radial passageway 100 which extends from the outer peripheral surface of the lower hub portion to the inner surface of the slot 76. An annular groove 102 is provided in the outer surface of the lower hub portion 72 about the outer end of the passageway 100 and an O-ring 104 is positioned therein so as to engage the inner surface of the inner liner 80 and prevent the escape of fluid between the hub portion and the sleeve when the device is in operation.

An aperture 106 is provided in the inner liner 80 in radial alignment with the outer end of the passageway 100, and the outer jacket 82 contains an internally threaded opening 108 which receives a control screw 110 which has a conical shaped end 112 adapted to seat in the aperture 106 to close off the passageway 100.

In use, the sleeve member 78 is removed from the body member and the control screw 110 threaded inwardly to seal off the aperture 106. The vent plug 92 is then removed and the reservoir 88 filled with the selected liquid. The vent plug is then replaced and one end of the rope is twisted about the shaft portion 68 and positioned in the slots 74 and 76. Thereafter, the sleeve member 78 is positioned over the hub portions with the ball detent 48 in engagement with the aperture 60 as in the embodiment disclosed in FIGS. 1 through 3.

Immediately prior to using the device, the trooper backs off the control screw 110 to permit the liquid to flow from the reservoir 88 through the passageway 100 and into the slot 76 to impregnate that portion of the rope which is positioned in the last-mentioned slot. Additional liquid may also flow along a portion of the rope which depends below the device. Consequently, when the trooper jumps from the aircraft, the rope which passes through the device and around the shaft portion thereof will enter at the lowermost slot 76 and absorb the liquid which flows from the inner end of the passageway 100. Obviously, the amount of liquid which flows onto the rope depends upon the size of the passageway 100, the distance the screw 100 is backed off, and the speed at which the rope passes through the device. The fact that the rope is wetted as it passes through the device aids in preventing a charring of the rope and the vaporization of the liquid from the rope as it passes around the shaft portion 68 further removes some of the heat from the device.

Thus, it is apparent that there has been provided various forms of a liquid-cooled and heat-shielded descent control device hich fulfill all of the objects and advantages sought therefor. By using a device constructed in accordance with the teachings of the present invention, a paratrooper or the like can descend quickly and safely from an aircraft or an elevated structure, and the insulated jacket and liquid-cooled shaft portion and/or jacket prevents the trooper from burning his hands even though the device be reused numerous times in quick succession, as by pulling it back to a hovering aircraft with a light line fastened to the ring portion 42 of the plug 40 (FIG. 2), or be used where the distance to the ground is quite long so as to cause considerable frictional heat to be produced in the device.

It is to be understood that the foregoing description and the accompanying drawings have been given only by way of illustration and example and that changes and alterations in the present disclosure which will be readily

I claim:

1. A descent control device for frictional sliding engagement with a length of rope, comprising:
a body member of heat-conducting material having an elongated shaft portion with an outer surface of a length to receive varying turns of rope thereabout;
a hub portion adpjacent each end of the shaft portion;
at least one generally axially extending passageway with an inner surface in each hub portion,
said passageway being of a size to slidably receive the length of rope;
attachment means connected to the body member;
container means for receiving a body of fluid having a predetermined vaporization temperature positioned in heat-receiving relationship with said body member to receive therefrom heat produced therein by the sliding frictional engagement of a rope with the body member; and
means in communication with the interior of the container means for venting to the atmosphere any vapor produced from said fluid by the heat of friction generated in the body member by the sliding rope.

2. A descent control device for frictional sliding engagement with a length of rope, comprising:
a body member of heat-conducting material having an elongated shaft portion with an outer surface of a length to receive varying turns of rope thereabout;
a hub portion adjacent each end of the shaft portion;
at least one generally axially extending passageway with an inner surface in each hub portion,
said passageway being of a size to slidably receive the length of rope;
attachment means connected to the body member;
container means for receiving a body of fluid having a predetermined vaporization temperature positioned in heat-receiving relationship with said body member to receive therefrom heat produced therein by the sliding frictional engagement of a rope with the body member; and
open passage means between the interior of the container means and the atmosphere for venting to the atmosphere any vapor produced from said fluid by the heat of friction generated in the body member by the sliding rope.

3. A descent control device for frictional sliding engagement with a length of rope, comprising:
a body member of heat-conducting material having an elongated shaft portion with an outer surface of a length to receive varying turns of rope thereabout;
a hub portion adjacent each end of the shaft portion;
at least one generally axially extending passageway with an inner surface in each hub portion,
said passageway being of a size to slidably receive the length of rope;
attachment means connected to the body member;
container means positioned in heat-receiving relationship with said body member to receive therefrom heat produced therein by the sliding frictional engagement of a rope with the body member;
a body of fluid in said container means having a vaporization temperature greater than the ambient temperature of the locality where the device is to be used but less than a value which would burn a person's hand in prolonged contact therewith; and
means in communication with the interior of the container means for venting to the atmosphere any vapor produced from said fluid by the heat of friction generated in the body member by the rope.

4. A descent control device for frictional sliding engagement with a length of rope, comprising:
a body member of heat-conducting material having an elongated shaft portion with an outer surface of a length to receive varying turns of rope thereabout;
a hub portion adjacent each end of the shaft portion;
at least one generally axially extending passageway with an inner surface in each hub portion,
said passageway being of a size to slidably receive the length of rope;
attachment means connected to the body member;
container means positioned in heat-receiving relationship with said body member to receive therefrom heat produced therein by the sliding frictional engagement of a rope with the body member;
a body of fluid in said container means having a vaporization temperature greater than the ambient temperature of the locality where the device is to be used but less than about 110° F.; and
means in communication with the interior of the container means for venting to the atmosphere any vapor produced from said fluid by the heat of friction generated in the body member by the rope.

5. A descent control device for frictional sliding engagement with a length of rope, comprising:
a body member of heat-conducting material having an elongated shaft portion with an outer surface of a length to receive varying turns of rope thereabout;
a hub portion adjacent each end of the shaft portion;
at least one generally axially extending passageway with an inner surface in each hub portion,
said passageway being of a size to slidably receive the length of rope;
attachment means connected to the body member;
an elongated cavity in said shaft portion of a size to receive a body of fluid having a predetermined vaporization temperature; and
means in communication with the interior of the cavity for venting to the atmosphere any vapor produced from said fluid by the heat of friction generated in the body member by the sliding rope.

6. A descent control device for frictional sliding engagement with a length of rope, comprising:
a body member of heat-conducting material having an elongated shaft portion with an outer surface of a length to receive varying turns of rope thereabout;
a hub portion adjacent each end of the shaft portion;
at least one generally axially extending passageway with an inner surface in each hub portion,
said passageway being of a size to slidably receive the length of rope;
attachment means connected to the body member;
an elongated cavity in said shaft portion of a size to receive a body of fluid having a predetermined vaporization temperature;
a filling opening adjacent the upper end of the cavity; and
a combination filling and vent plug removably mounted in said opening,
said plug containing a passageway therethrough for venting to the atmosphere any vapor produced from said fluid by the heat of friction generated in the body member by the sliding rope.

7. A descent control device as set forth in claim 6 in which the passageway in the combination filling and vent plug is provided with a pressure responsive valve which remains closed until the vapor attains a predetermined value.

8. A descent control device for frictional sliding engagement with a length of rope, comprising:
a body member of heat-conducting material having an elongated shaft portion with an outer surface of a length to receive varying turns of rope thereabout;
a hub portion adjacent each end of the shaft portion;
at least one generally axially extending passageway with an inner surface in each hub portion,
said passageway being of a size to slidably receive the length of rope;
attachment means connected to the body member;

an elongated cavity in said shaft portion having a filling opening adjacent one end thereof;

a wick of absorbent material in said cavity saturated with a fluid having a predetermined vaporization temperature; and a combination filling and vent plug removably positioned in said filling opening and containing a passageway therethrough for venting to the atmosphere any vapor produced from said fluid by the heat of friction generated in the body member by the sliding rope.

9. A descent control device for frictional sliding engagement with a length of rope, comprising:

a body member of heat-conducting material having an elongated shaft portion with an outer surface of a length to receive varying turns of rope thereabout;

a hub portion adjacent each end of the shaft portion;

at least one generally axially extending passageway with an inner surface in each hub portion, said passageway being of a size to slidably receive the length of rope;

the inner surface of each passageway being substantially coextensive with the outer surface of the shaft portion;

attachment means connected to the body member;

an elongated cavity in the shaft portion of a size to receive a body of fluid having a predetermined vaporization temperature;

means in communication with the interior of the cavity adjacent the upper end thereof for venting to the atmosphere any vapor produced from said fluid by the heat of friction generated in the body member by a sliding rope;

a rigid sleeve member removably mounted on said body member in engagement with the hub portions thereof, said sleeve member containing means for controlling the flow of heat from said body member.

10. A descent control device as set forth in claim 9 in which the rigid sleeve member comprises a perforated tubular element.

11. A descent control device as set forth in claim 9 in which the rigid sleeve member comprises a tubular element of heat insulating material.

12. A descent control device as set forth in claim 9 which contains a wick of fluid-absorbent material in the cavity.

References Cited by the Examiner

UNITED STATES PATENTS

| | | | |
|---|---|---|---|
| 439,263 | 10/1890 | Zein et al. | 188—65.3 |
| 644,404 | 2/1900 | Christ et al. | 188—65.4 |
| 771,251 | 10/1904 | Howe | 188—65.4 |
| 779,550 | 1/1905 | Leffelman | 188—65.2 |
| 1,103,849 | 7/1914 | Steinborg | 188—65.2 |
| 1,115,603 | 11/1914 | Smith | 188—65.4 |
| 1,411,240 | 3/1922 | Evans | 294—12 |
| 2,001,286 | 5/1935 | Reith | 294—12 |
| 2,372,984 | 4/1945 | Pierce | 188—264 |

FOREIGN PATENTS 13,939   10/1887   Great Britain.

MILTON BUCHLER, *Primary Examiner.*

EUGENE G. BOTZ, *Examiner.*

Notice of Adverse Decision in Interference

In Interference No. 95,643 involving Patent No. 3,220,511, E. E. Holkesvick, LIQUID-COOLED DESCENT CONTROL DEVICE, final judgment adverse to the patentee was rendered Dec. 18, 1969, as to claims 1, 2, 5, 6, 7, 9 and 10.

[*Official Gazette July 7, 1970.*]